United States Patent
Hwang et al.

(10) Patent No.: US 9,336,095 B2
(45) Date of Patent: May 10, 2016

(54) COMPUTING SYSTEM AND RELATED DATA MANAGEMENT METHOD THEREOF

(71) Applicant: SAMSUNG ELECTRONICS CO., LTD., Suwon-Si, Gyeonggi-Do (KR)

(72) Inventors: Joo-Young Hwang, Suwon-Si (KR); Jae-Geuk Kim, Hwaseong-Si (KR); Chang-Man Le, Seoul (KR); Chul Lee, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 246 days.

(21) Appl. No.: 14/038,953

(22) Filed: Sep. 27, 2013

(65) Prior Publication Data

US 2014/0095437 A1 Apr. 3, 2014

(30) Foreign Application Priority Data

Sep. 28, 2012 (KR) ........................ 10-2012-0109190

(51) Int. Cl.
*G06F 17/00* (2006.01)
*G06F 7/00* (2006.01)
*G06F 11/14* (2006.01)

(52) U.S. Cl.
CPC ........ *G06F 11/1469* (2013.01); *G06F 2201/84* (2013.01)

(58) Field of Classification Search
CPC ............ G06F 11/1471; G06F 11/1004; G06F 11/1469; G06F 11/2074; G06F 12/0246; G06F 11/1458

See application file for complete search history.

(56) References Cited

U.S. PATENT DOCUMENTS

| | | | |
|---|---|---|---|
| 6,654,912 B1 | 11/2003 | Viswanathan et al. | |
| 7,467,265 B1 * | 12/2008 | Tawri | G06F 12/0813 711/161 |
| 7,613,743 B1 | 11/2009 | Giampaolo et al. | |
| 7,680,837 B2 | 3/2010 | Yamato | |
| 7,689,599 B1 | 3/2010 | Shah et al. | |
| 7,900,088 B1 | 3/2011 | Pawar et al. | |
| 8,055,864 B2 | 11/2011 | Sawdon et al. | |
| 8,145,686 B2 | 3/2012 | Raman et al. | |
| 8,224,780 B2 | 7/2012 | Cargille et al. | |
| 2006/0253502 A1* | 11/2006 | Raman et al. | 707/202 |
| 2011/0082835 A1 | 4/2011 | Agrawal et al. | |
| 2011/0161299 A1 | 6/2011 | Prahlad et al. | |
| 2011/0246503 A1* | 10/2011 | Bender et al. | 707/769 |

FOREIGN PATENT DOCUMENTS

JP 2000-040023 2/2000

* cited by examiner

*Primary Examiner* — Angelica Ruiz
(74) *Attorney, Agent, or Firm* — Volentine & Whitt, PLLC

(57) ABSTRACT

A method of performing data management in a computing system comprises performing a checkpointing operation comprising storing checkpoint of the computing system, writing a plurality of nodes in a plurality of node blocks in a sequential write method after the checkpointing operation, each of the plurality of nodes comprising position information of a next node block, and during a subsequent recovery operation, selecting a node for recovery by scanning of the plurality of node blocks using the position information.

15 Claims, 19 Drawing Sheets

FIG. 6

| NODE ID | PHYSICAL ADDRESS |
|---|---|
| N0 | a |
| N1 | b |
| N2 | c |
| ⋮ | |

COMPUTING SYSTEM AND RELATED DATA MANAGEMENT METHOD THEREOF

CROSS-REFERENCE TO RELATED APPLICATIONS

This application claims priority under 35 U.S.C. §119 to Korean Patent Application No. 10-2012-0109190 filed on Sep. 28, 2012, the subject matter of which is hereby incorporated by reference.

BACKGROUND OF THE INVENTION

The inventive concept relates generally to a computing system and a related data management method. More particularly, certain embodiments of the inventive concept relate to a computing system and a related data management method using a log structured file system.

Checkpointing is a process in which a system stores information regarding its state so that it the state can be restored at a later time. Typically, checkpointing is accomplished by storing a snapshot of the system state at periodic intervals or in response to certain events, such as data updates.

A common application of checkpointing is fault recovery. For instance, if system operation is interrupted due to an unexpected power loss, system recovery may be accomplished using information captured through checkpointing.

Although checkpointing can potentially prevent data loss, it also tends to increase system overhead. Accordingly, there is a general need for techniques for reducing the overhead produced by checkpointing.

SUMMARY OF THE INVENTION

In one embodiment of the inventive concept, a method of performing data management in a computing system comprises performing a checkpointing operation comprising storing checkpoint of the computing system, writing a plurality of nodes in a plurality of node blocks in a sequential write method after the checkpointing operation, each of the plurality of nodes comprising position information of a next node block, and during a subsequent recovery operation, selecting a node for recovery by scanning of the plurality of node blocks using the position information.

In another embodiment of the inventive concept, a computing system comprises a storage device comprising a first area and a second area, and a host device controlling the storage device. The host device stores checkpoints in the first area, stores a plurality of data in a plurality of data blocks of the second area, and stores a plurality of nodes corresponding to the plurality of data in a plurality of node blocks of the second area, and wherein each of the nodes comprises position information of a next node block, and a node for which recovery is to be performed is selected by scanning the plurality of node blocks using the position information during a recovery operation.

These and other embodiments of the inventive concept can potentially improve the efficiency of a file system by reducing the number of operations required to perform certain types of updates.

BRIEF DESCRIPTION OF THE DRAWINGS

The drawings illustrate selected embodiments of the inventive concept. In the drawings, like reference numbers indicate like features.

FIG. 6 is a diagram of a node address table according to an embodiment of the inventive concept.

DETAILED DESCRIPTION OF THE EMBODIMENTS

Embodiments of the inventive concept are described below with reference to the accompanying drawings. These embodiments are presented as teaching examples and should not be construed to limit the scope of the inventive concept.

In the description that follows, although the terms first, second, etc. may be used herein to describe various elements, components, regions, layers and/or sections, these elements, components, regions, layers and/or sections should not be limited by these terms. Rather, these terms are only used to distinguish one element, component, region, layer or section from another element, component, region, layer or section. Thus, a first element, component, region, layer or section discussed below could be termed a second element, component, region, layer or section without materially changing the meaning of the relevant description.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "comprising," when used in this specification, specify the presence of the stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
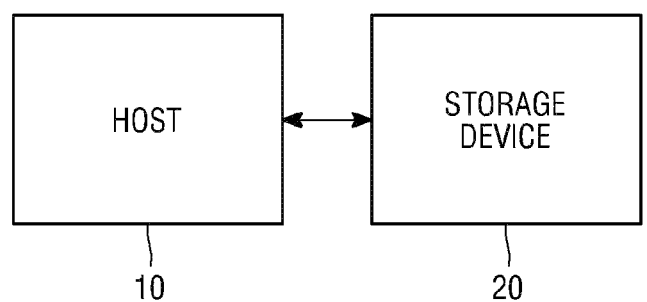
FIG. 1 is a diagram of a computing system according to an embodiment of the inventive concept.
Figure 2:
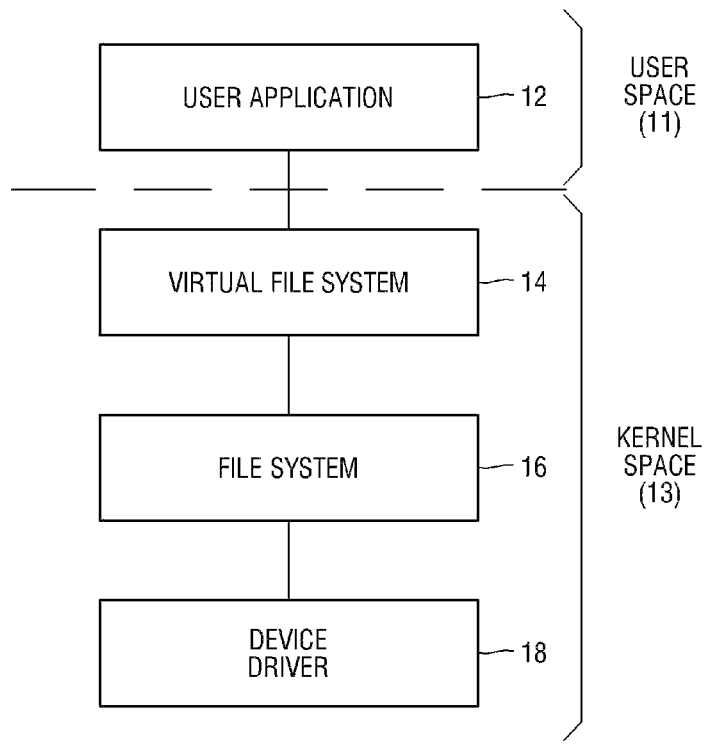
FIG. 2 is a diagram of a host shown in FIG. 1 according to an embodiment of the inventive concept.
Figure 3:
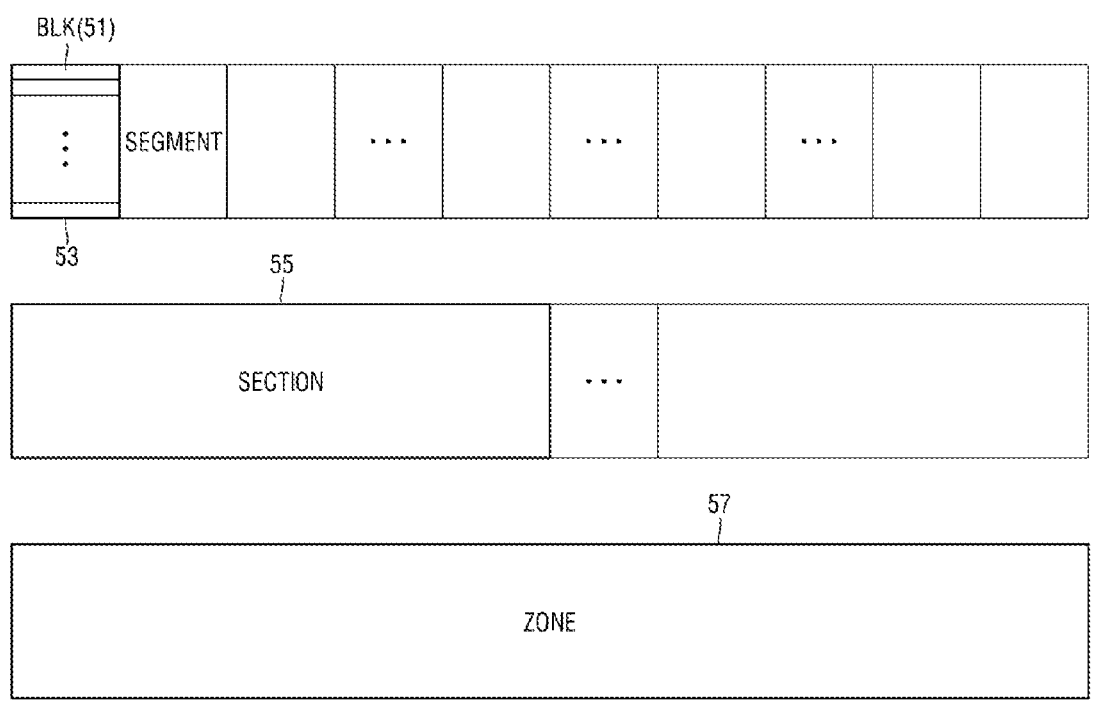
FIG. 3 is a diagram of a storage device shown in FIG. 1 according to an embodiment of the inventive concept.
Figure 4:
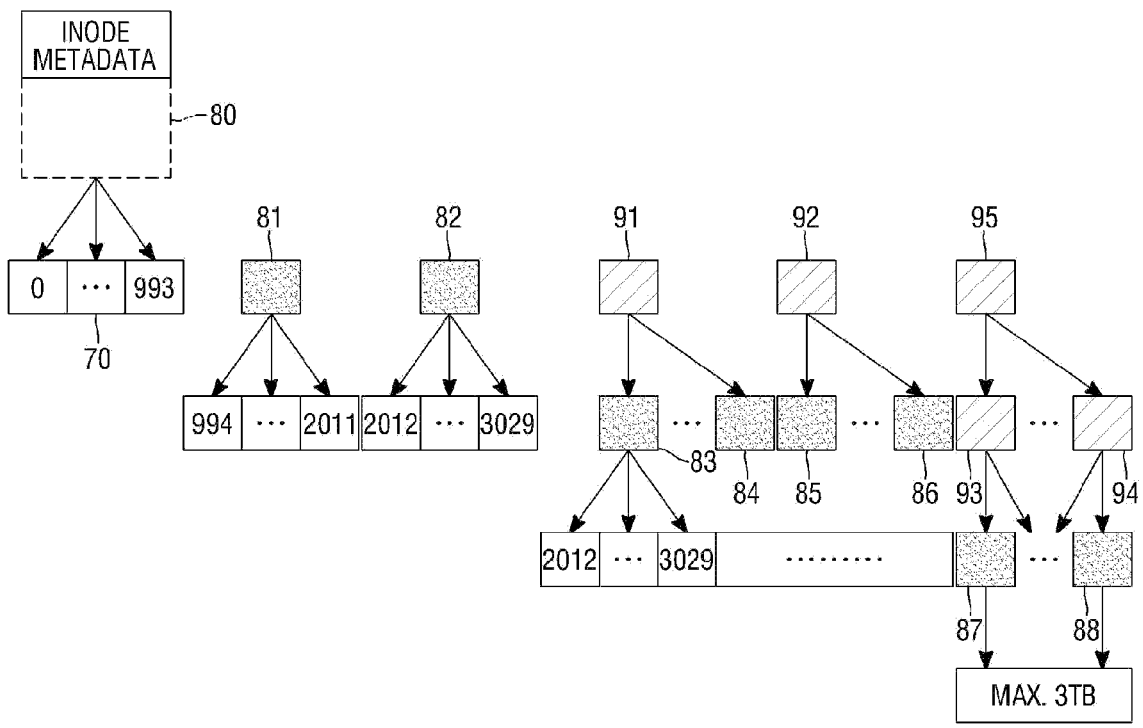
FIG. 4 is a diagram of a file stored in the storage device of FIG. 1 according to an embodiment of the inventive concept.
Figure 5:
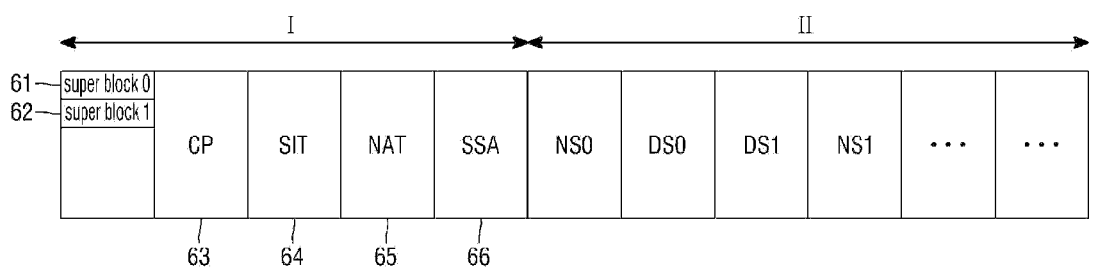
FIG. 5 is a diagram of the storage device of FIG. 1 according to an embodiment of the inventive concept.
Figure 6:
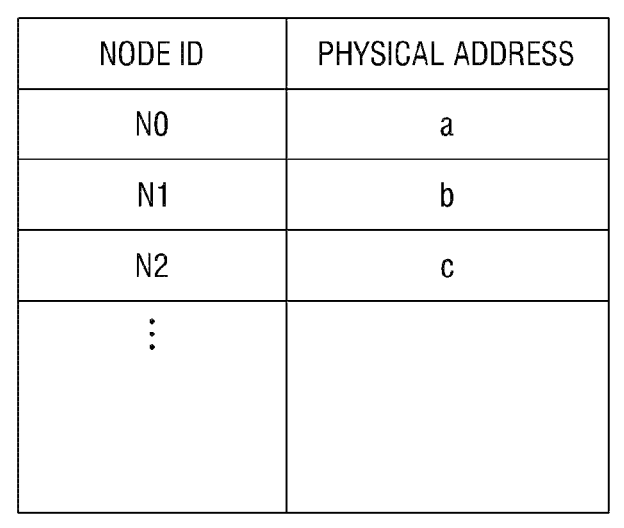

FIG. 1 is a diagram of a computing system according to an embodiment of the inventive concept. FIG. 2 is a block diagram of a host in the computing system in FIG. 1 according to an embodiment of the inventive concept. FIGS. 3 and 5 are block diagrams of a storage device in the computing system of FIG. 1 according to various embodiments of the inventive concept. FIG. 4 is a diagram illustrating the structure of a file stored in the storage of FIG. 1 according to an embodiment of the inventive concept. FIG. 6 is a diagram of a node address table used by a file system of the computing system of FIG. 1 according to an embodiment of the inventive concept.

Referring to FIG. 1, a computing system 1 comprises a host 10 and a storage device 20. Host 10 controls storage device 20. For example, host 10 may write data in storage device 20 or read the data from storage device 20. Host 10 and storage device 20 typically communicate with each other directly using a defined protocol. For example, host 10 and storage device 20 can communicate with each other through at least one of various standard interface protocols, such as a Universal Serial Bus (USB) protocol, an Multimedia Card (MMC) protocol, a Peripheral Component Interconnection (PCI) protocol, a PCI-Express (PCI-E) protocol, an Advanced Technology Attachment (ATA) protocol, a serial-ATA protocol, a parallel-ATA protocol, a Small Computer Small Interface (SCSI) protocol, an Enhanced Small Disk Interface (ESDI) protocol, and an Integrated Drive Electronics (IDE) protocol. However, the interface protocols are not limited thereto.

Referring to FIG. 2, host 10 comprises a user space 11 and a kernel space 13. User space 11 is a region for executing a user application 12, and kernel space 13 is a region for executing kernel functions. User space 11 accesses kernel space 13 using a system call.

Kernel space 13 comprises a virtual file system 14, at least one file system 16, and a device driver 18. The at least one file system 16 may comprise, for example, ext2, ntfs, smbfs, proc, and the like. Further, a computing system 1 may include an F2FS file system, examples of which are described below in relation to FIGS. 3 to 17.

Virtual file system 14 enables one or more file systems 16 to operate in coordination with each other. To perform read/write tasks with respect to different file systems 16 of different media, standardized system calls may be used. For example, system calls, such as open( ) read( ) and write( ) may be used regardless of the kind of the file systems 16. That is, virtual file system 14 is an abstract layer that exists between user space 11 and file system 16.

Device driver 18 manages an interface between hardware and a user application (or operating system). For example, device driver 18 may be is a program allowing the hardware to normally operate under a specific operating system.

The following description explains the use of a F2FS file system in storage device 20. Storage device 20 may be one of various kinds of cards, such as a solid state disk (SSD), a hard disk drive (HDD), and eMMC, or a data server, but is not limited thereto.

Storage device 20 may be configured as illustrated in FIG. 3. As illustrated in FIG. 3, a segment (SEGMENT) 53 comprises a plurality of blocks (BLK) 51, a section (SECTION) 55 comprises a plurality of segments 53, and a zone (ZONE) 57 comprises a plurality of sections 55. For example, the block 51 may be of 4K byte, and the segment 53 may be of 2M byte since the segment 53 includes 512 blocks 51. Such a configuration may be determined during formatting of storage device 20, but is not limited thereto. The sizes of the section 55 and the zone 57 may be corrected during the formatting. The F2FS file system may read/write all data in the unit of a page of 4K byte. That is, one page may be stored in the block 51, and a plurality of pages may be stored in the segment 53.

A file stored in storage device 20 may have an indexing structure as illustrated in FIG. 4. One file may comprise multiple units of data and multiple corresponding nodes. Data blocks 70 are regions that store data, and node blocks 80, 81 to 88, and 91 to 95 are regions that store nodes.

Node blocks 80, 81 to 88, and 91 to 95 comprise direct node blocks 81 to 88, indirect node blocks 91 to 95, and an index node (inode) block 80. In FIG. 4, the direct node blocks are indicated by shading and the indirect node blocks are indicated by hatching lines.

Direct node blocks 81 to 88 comprise data pointers directly pointing to data blocks 70. Indirect node blocks 91 to 95 comprise pointers to other node blocks (that is, lower node blocks) 83 to 88 which are not the data blocks 70. Indirect node blocks 91 to 95 may include, for example, first indirect node blocks 91 to 94 and a second indirect node block 95. First indirect node blocks 91 to 94 include first node pointers to direct node blocks 83 to 88, and second indirect node block 95 includes second node pointers to first indirect node blocks 93 and 94.

Inode block 80 comprises at least one of data pointers, the first node pointers to direct node blocks 81 and 82, second node pointers to first indirect node blocks 91 and 92, and a third node pointer to second indirect node block 95. One file may have a maximum size of, for example, 3 terabytes, and this large-capacity file may have the following index structure. For example, 994 data pointers are provided in the inode block 80, and the 994 data pointers may point to 994 data blocks 70. Two first node pointers are provided, and each of the two first node pointers may indicate two direct node blocks 81 and 82. Two second code pointers are provided, and the two second node pointers may indicate two first indirect node blocks 91 and 92. One third node pointer is provided, and may indicate the second indirect node blocks 95. Inode pages may also include inode metadata by files.

As shown in FIG. 5, in computing system 1, storage device 20 may be divided into a first area I and a second area II. File system 16 typically divides storage device 20 into first area I and the second area II during formatting, but is not limited thereto. First area I is an area storing various kinds of system level information, and may include, for example, information on the number of files currently allocated, the number of valid pages, and positions. Second area II is an area storing various kinds of directory information that a user actually uses, data, and file information.

First area I may be stored in a front portion of storage device 20, and the second area II may be stored in a rear portion of storage device 20. Here, the front portion means the portion that is in front of the rear portion based on physical address.

First region I comprises superblocks 61 and 62, a checkpoint area (CP) 63, a segment information table (SIT) 64, a node address table (NAT) 65, and a segment summary area (SSA) 66. Superblocks 61 and 62 store default information of file system 16, such as the size of block 51, the number of blocks 51, status flags (clean, stable, active, logging, and unknown). As illustrated, two superblocks 61 and 62 may be provided, and the same contents may be stored in the respective superblocks. Accordingly, where a defect occurs in one of the two superblocks, the other one may be used.

Checkpoints are stored in a checkpoint area 63. A checkpoint corresponds to a logical breakpoint of computer system 1, and it stores a state of the system up to the breakpoint. Accordingly, if a system fault (for example, shutdown) occurs during the operation of the computing system, file system 16 can restore data using the checkpoint. Such a checkpoint may be generated, for example, periodically or at a system shutdown time point, but is not limited thereto. Details of the checkpoint, a checkpointing operation, and a recovery operation will be described later using FIGS. 10 to 17.

As illustrated in FIG. 6, node address table 65 comprises a plurality of node identifiers (NODE ID) corresponding to the respective nodes and a plurality of physical addresses corresponding to the plurality of node identifiers. For example, the node block corresponding to node identifier N0 may correspond to a physical address "a", the node block corresponding to node identifier N1 may correspond to a physical address "b", and the node block corresponding to the node identifier N2 may correspond to a physical address "c". All nodes (inode, direct nodes, and indirect nodes) have inherent node identifiers. In other words, all nodes (inode, direct nodes, and indirect nodes) may be allocated with inherent node identifiers from node address table 65. Node address table 65 stores the node identifier of the inode, the node identifiers of the direct nodes, and the node identifiers of the indirect nodes. The respective physical addresses corresponding to the respective node identifiers may be updated.

Segment information table 64 includes the number of valid pages of each segment and bit maps for the plurality of pages. The bit map indicates whether each page is valid, e.g., using a "0" or "1". The segment information table 64 may be used in a cleaning task (or garbage collection). The use of the bit map may reduce unnecessary read requests when the cleaning task is performed, and may be used to allocate the blocks during adaptive data logging.

Segment summary area 66 is an area that stores summary information for each segment of second area II. Specifically, segment summary area 66 stores information for each node of second area II. Segment summary area 66 may be used for cleaning tasks (or garbage collection).

Node blocks 80, 81 to 88, and 91 to 95 have a node identifier list or address to confirm positions of data blocks 70 or lower node blocks (for example, direct node blocks). By contrast, segment summary area 66 provides indices whereby data blocks 70 or lower node blocks 80, 81 to 88, and 91 to 95 can confirm the positions of the upper node blocks 80, 81 to 88, and 91 to 95. Segment summary area 66 comprises a plurality of segment summary blocks, where each segment summary block has information on one segment located in second area II. Further, the segment summary block comprises multiple units of summary information, and one unit of summary information corresponds to one data block or one node block. Second area II further comprises data segments DS0 and DS1 and node segments NS0 and NS1, which are separated from each other. The data may be stored in the data segments DS0 and DS1, and the plurality of nodes may be stored in node segments NS0 and NS1. Where the data and the nodes are separated in different areas, the segments can be effectively managed, and the data can be read more effectively in a short time.

Second area II may be an area that is written by a sequential access method, and first area I may be an area that is written by a random access method. Second area I may be stored in a rear portion of storage device 20, and first area I may be stored in a front portion of storage device 20.

If storage device 20 is, for example, an SSD, a buffer may be provided inside the SSD. The buffer may be, for example, a Single Layer Cell (SLC) memory having high read/write speed. Such a buffer can increase the write speed in the random access method in a limited space.

In the drawings, first area I comprises superblocks 61 and 62, checkpoint area 63 62, segment information table 64, node address table 65, and segment summary area 66, which are arranged in order, but is not limited thereto. For example, the relative positions of segment information table 64 and node address table 65 may be changed, and the relative positions of node address table 65 and segment summary area 66 may be changed.

Figure 7:
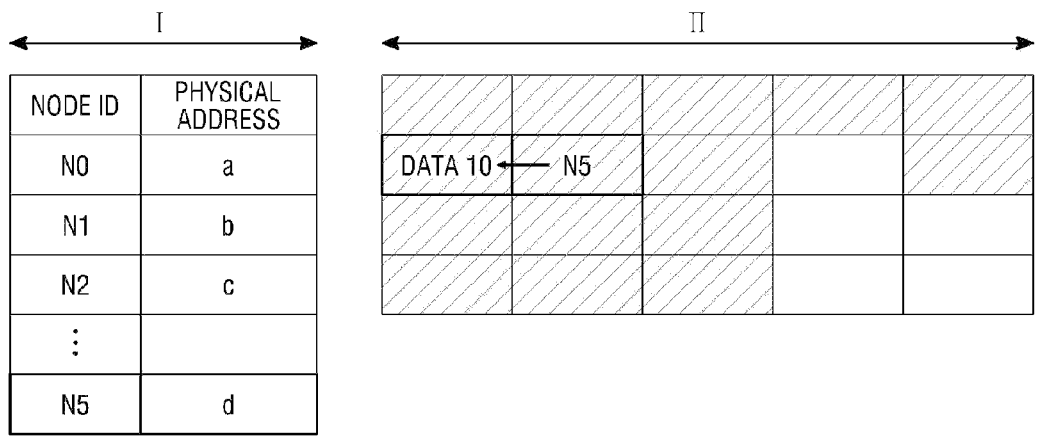
FIG. 7 is a conceptual diagram illustrating a data management method according to an embodiment of the inventive concept.
Figure 8:
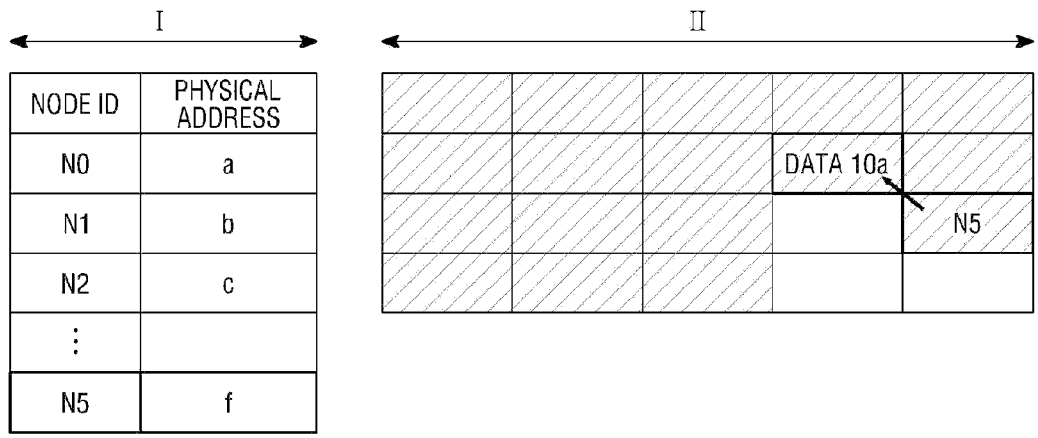
FIG. 8 is another conceptual diagram illustrating the data management of FIG. 7.

FIGS. 7 and 8 are conceptual diagrams illustrating a data management method for a computing system according to an embodiment of the inventive concept.

Referring to FIG. 7, file system 16 divides the storage device into first area I and second area II. As described above, the division of the storage device into first area I and the second area II may be performed during formatting of storage device 20.

As described above in relation to FIG. 4, file system 16 may comprise one file with a plurality of data and a plurality of nodes (for example, an inode, direct nodes, and indirect nodes) related to the plurality of data, and may store the file in storage device 20.

All the nodes are assigned with node identifiers (NODE ID) from node address table 65. For example, it is assumed that N0 to N5 are allocated. The node blocks corresponding to N0 to N5 may correspond to respective physical addresses a, b, . . . , and d. Hatched portions illustrated in FIG. 7 indicate locations where data and nodes are written in the second area II.

As an example, direct node N5 may indicate DATA10. Direct node N5 is stored in the node block corresponding to physical address d. That is, in node address table 65, direct node N5 is stored to correspond to physical address d.

Referring to FIG. 8, an example where partial data DATA10 is corrected to DATA10a in the file will be described as follows.

Second area II is an area that is written in the sequential access method. Accordingly, corrected data DATA10a is newly stored in a vacant data block. Further, the direct node N5 is corrected to indicate the data block in which the corrected data DATA10a is stored, and is newly stored in the vacant node block.

First area I is an area that is written in the random access method. Accordingly, direct node N5 corresponds to the physical address f, and is overwritten.

The partial data in the file may be corrected as follows. Among the data, the first data is stored in the first block corresponding to the first physical address, the first direct node indicates the first data, and the first direct node is stored in the second block corresponding to the second physical address. In the node address table, the first direct node corresponds to the second physical address to be stored. Here, the second data is generated by correcting the first data. The second data is written in the third block corresponding to the third physical address that is different from the first physical address. The first direct node is corrected to indicate the second data, and is written in the fourth block corresponding to the fourth physical address that is different from the second physical address. Further, in the node address table, the first direct node corresponds to the fourth physical address to be overwritten.

In a log structured file system, by using the node address table 65, the amount of data and nodes to be corrected can be reduced when correcting the partial data of the file. For instance, only corrected data and direct nodes that directly indicate the corrected data are written in the sequential access method, and it is not necessary to correct the inode or the indirect nodes that indicate the direct nodes. This is because physical addresses corresponding to the direct nodes have been corrected in node address table 65.

Figure 9A:
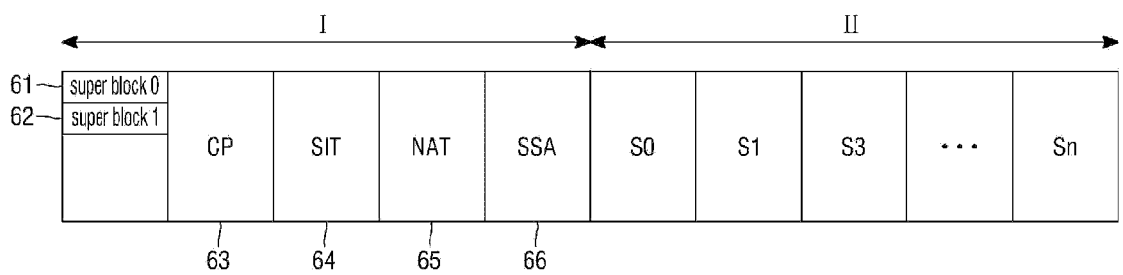
FIG. 9A is a diagram illustrating another example of the storage device of FIG. 1 according to an embodiment of the inventive concept.
Figure 9B:
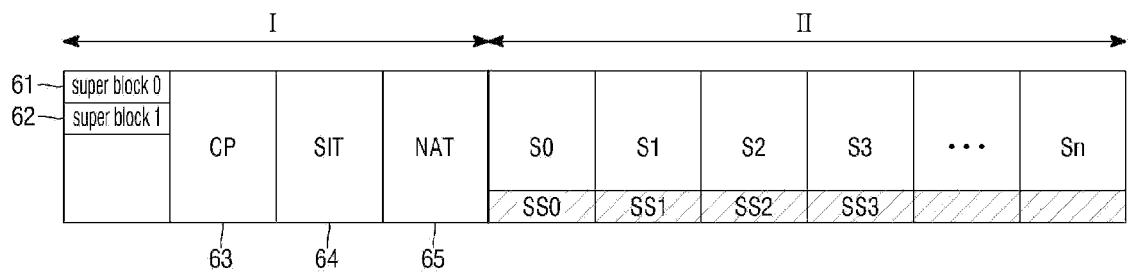
FIG. 9B is a diagram illustrating another example of the storage device of FIG. 1 according to an embodiment of the inventive concept.
Figure 9C:
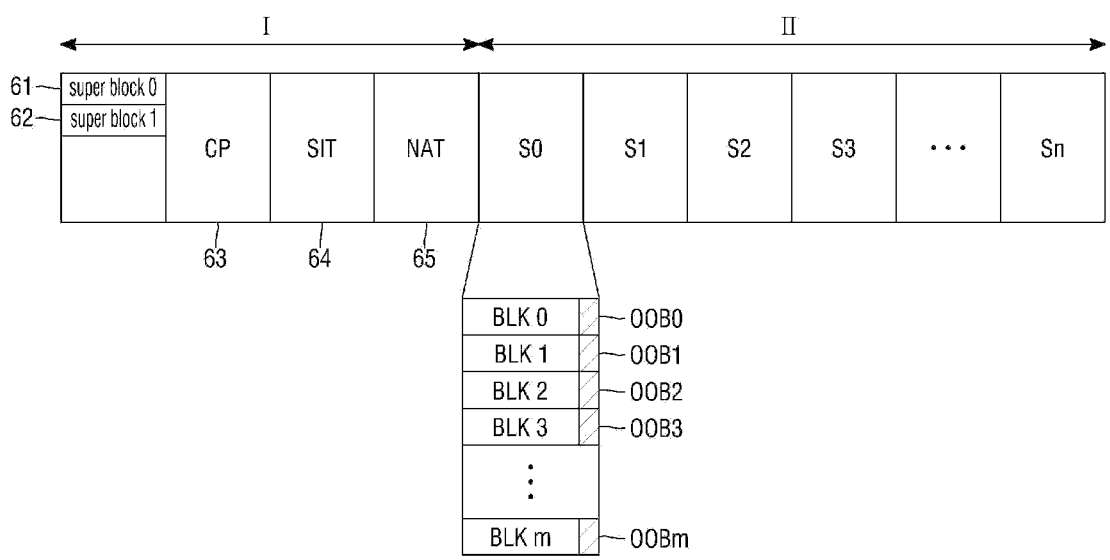
FIG. 9C is a diagram illustrating another example of the storage device of FIG. 1 according to an embodiment of the inventive concept.

FIGS. 9A to 9C are block diagrams illustrating various alternative configurations of a storage device 20 of FIG. 1 according to an embodiments of the inventive concept. For the sake of brevity, the following explanation will focus on features that are different from those discussed above in relation to other figures, such as FIG. 5.

Referring to FIG. 9A, in one example of storage device 20, second area II comprises a plurality of segments S1 to Sn that are separated from each other. In the respective segments S1 to Sn, data and nodes may be stored without distinction. However, in some embodiments, storage device 20 comprises data segments DS0 and DS1 and node segments NS0 and NS1 that are separated from each other. The plurality of data may be stored in the data segments DS0 and DS1, and the plurality of nodes may be stored in the node segments NS0 and NS1.

Referring to FIG. 9B, in another example of storage device 20, first area I omits segment summary area (see 66 in FIG. 5) and merely comprises superblocks 61 and 62, checkpoint area 63, segment information table 64, and node address table 65. Second area II stores the segment summary information. Specifically, the second area II comprises a plurality of segments S0 to Sn, and each of the segments So to Sn is divided into a plurality of blocks. At least one block SS0 to SSn of each of the segments S0 to Sn stores the segment summary information.

Referring to FIG. 9C, in yet another example of storage device 20, first area I omits the segment summary area (see 66 in FIG. 5) and comprises superblocks 61 and 62, checkpoint area 63, segment information table 64, and node address table 65. Second area II stores the segment summary information. The second area II comprises a plurality of segments 53, where each of segments 53 is divided into a plurality of blocks BLK0 to BLKm and each block LBK0 to LBKm comprises out of band (OOB) areas OOB1 to OOBm. The segment summary information may be stored in the OOB areas OOB1 to OOBm.

FIGS. 10 to 17 illustrate examples of a checkpointing operation and a recovery operation used in a computing system according to an embodiment of the inventive concept.

Figure 10:
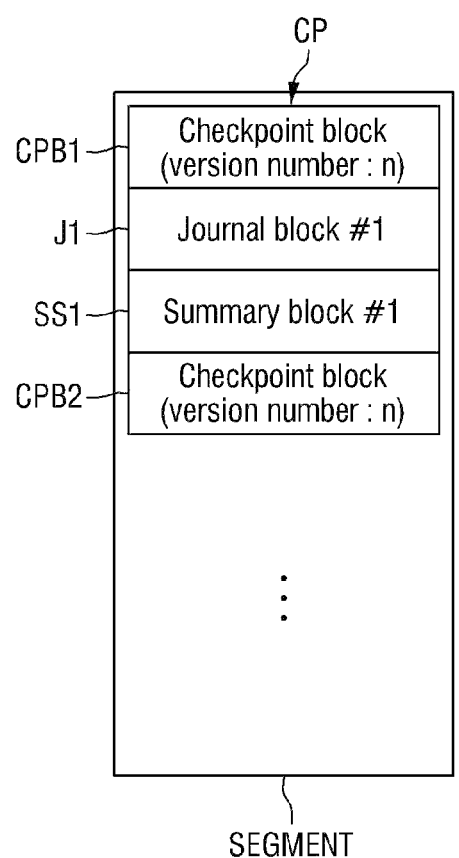
FIG. 10 is a diagram of a checkpoint used in a checkpointing operation of the computing system according to an embodiment of the inventive concept.
Figure 11:
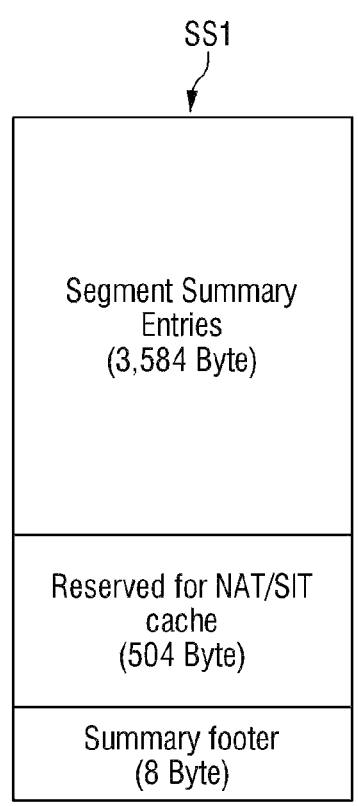
FIG. 11 is a diagram of a data segment summary block of a checkpoint.

FIG. 10 is a diagram illustrating an example configuration of a checkpoint used by computing system 1 according to an embodiment of the inventive concept, and FIG. 11 is a diagram illustrating an example configuration of a data segment summary block of a checkpoint according to an embodiment of the inventive concept.

Referring to FIG. 10, file system 16 (i.e., the F2FS system) performs a checkpointing function to generate checkpoints CP. As described above, the checkpoints CP are stored in a checkpoint area (see 63 in FIG. 5) of first area I of storage device 20. The checkpoint CP may comprise, for example, checkpoint blocks CPB1 and CPB2, a data segment summary block SS1, and a journal block J1.

Checkpoint blocks CPB1 and CPB2 comprise a header CPB1 of the checkpoint CP and a footer CPB2, and are located in the foremost and in the rearmost of the checkpoint CP. Further, the checkpoint blocks may have a checkpoint version number in order to discriminate what is the latest checkpoint CP.

Checkpoint blocks CPB1 and CPB2 may have the detailed configuration as shown in Table 1. Table 1 is merely an example, however, and the described embodiments are not limited thereto.

TABLE 1

| Name | Offset (Bytes) | Size (Bytes) | Notes |
| --- | --- | --- | --- |
| Checkpoint version | 0 | 8 | This indicates an age of the checkpoint. It typically starts from 0, and increases by 1. When being reset, it becomes 0 again. |
| User block count | 8 | 8 | The total number of blocks available to a user. |
| Valid block count | 16 | 8 | The number of valid block including live data. ({user block count} − {valid block count} is the number of free blocks. |
| Reserved segment count | 24 | 4 | The number of hidden free segments. This may be determined by the over-provisioned segment count. |
| Over-provisioned segment count | 28 | 4 | The number of over-provisioned segments. This is related to performance in garbage collection. |
| Free segment count | 32 | 4 | The number of free segments. |
| Bad segment count | 36 | 4 | The number of bad segments. |
| Active node segment number | 40 | 12 | The active node segment number among three active node segments. |

TABLE 1-continued

| Name | Offset (Bytes) | Size (Bytes) | Notes |
|---|---|---|---|
| Next free block segment in active node segment | 52 | 6 | The smallest block offset of a free block among three active node segments. |
| Next block offset to be confirmed in active node segment | 58 | 6 | The node block prior to this value is confirmed in three active node segments. |
| Active data segment number | 64 | 12 | The segment numbers of three active segments |
| Flag | 76 | 4 | The flag is generated in the case of umount. If the 0-th bit of the flag is 1, it means that the checkpoint is written under a umount command. Otherwise, it corresponds to a regular checkpoint. If the first bit of the flag is 1, it means that a journal block exists in the checkpoint. |
| Total block count in checkpoint | 80 | 4 | The block number of the current checkpoint. |
| Valid node count | 84 | 4 | The number of valid nodes. |
| Valid inode count | 88 | 4 | The number of valid inodes. |
| Next free node | 92 | 4 | The node number of the allocated free node. |
| SIT bitmap size | 96 | 4 | The byte size of the SIT bitmap. Default value is 64. |
| NAT bitmap size | 100 | 4 | The byte size of the NAT bitmap. Default value is 256. |
| Checksum offset | 104 | 4 | Byte offset of the checksum |
| STP bitmap | 108 | {SIT bitmap size} | Each bit is a set that corresponds to the SIT block including up-to-date data. |
| NAT bitmap | 108 + {SIT bitmap size} | {NAT bitmap size} | Each bit is a set that corresponds to the NAT block including up-to-date data |
| Checksum | {Checksum offset} | 4 | CRC32 of the F2Fs checkpoint block. The seed value is the F2FS magic number in the F2FS superblock. |

Referring to FIG. 11, data segment summary block SS1 stores a summary of the data segment in which write is currently performed. This has the same data structure as the segment summary that is stored in the segment summary area (see 66 in FIG. 5). An update is performed only where segment summary area 66 is completely filled with the data segments. However, a summary of active data segments that are in an unfilled state may be stored in the data segment summary block SS1.

Data segment summary block SS1 typically comprises a space for storing the data segment summary of 3584 bytes and may include a footer of 8 bytes. Changes of node address table NAT and segment information table SIT may be stored herein. If the node address table and the segment information table are stored in a separate block form, the write amount may be greatly increased. However, if both the node address table and the segment information table are stored in the data segment summary block SS1, the write amount is decreased, and the time required for generating the checkpoint is greatly reduced.

Journal block J1 contains orphan inode information. The orphan inode is an inode in which valid data exists but the corresponding directory entry is deleted. For consistency of the file system (see 16 in FIG. 2), the orphan inode must be removed. For example, the orphan inode may occur where several users simultaneously open the same file and perform tasks with respect to the same file. That is, if another user deletes the file which a specific user is opening to perform a task, the corresponding file is deleted from the directory, but the inode is unable to be deleted. In this state, if checkpointing is performed and power is turned off, the inode may become the orphan inode. Accordingly, file system 16 stores information of the orphan inode in journal block J1 during the checkpointing. During the recovery operation, the information of the orphan inode stored in the journal block may be checked to delete the orphan inode.

Figure 12:
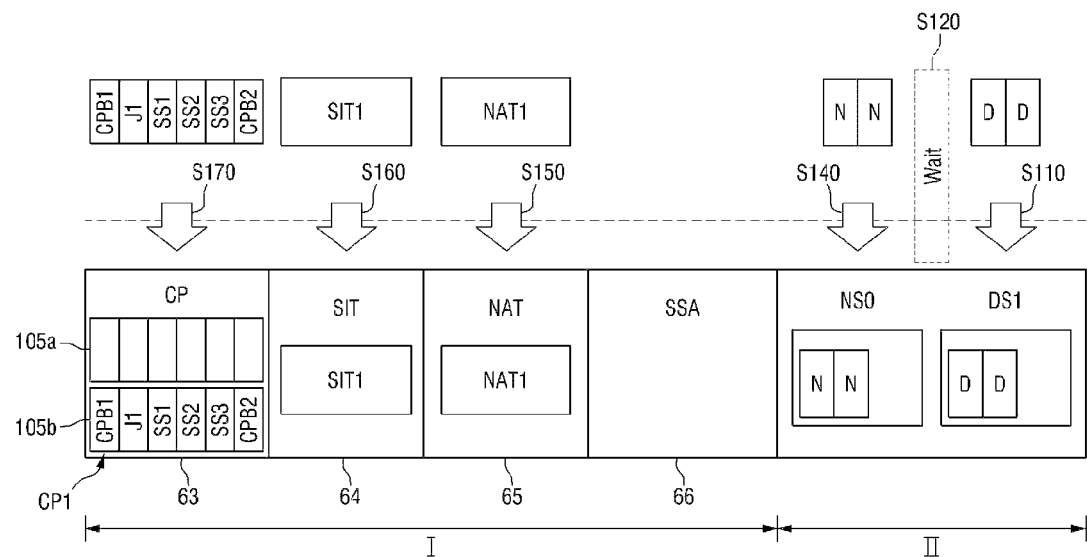
FIG. 12 is a diagram illustrating a checkpointing operation of a computing system according to an embodiment of the inventive concept.

FIG. 12 is a diagram illustrating a checkpointing operation of computing system 1 according to an embodiment of the inventive concept.

Referring to FIG. 12, where the checkpointing starts, file system 16 first stores all data in second area II of storage device 20 (S110). Typically this data is stored in a relevant data segment, e.g., data segment DS1 of FIG. 5.

Next, file system 16 freezes the operation to match the consistency (S120). Then, file system 16 stores a data-related node in second area II of storage device 20, e.g., in node segment NS0 in FIG. 5 (S140). Thereafter, file system 16 stores the segment information table SIT1 and the node address table NAT1 in first area I (S150 and S160).

Subsequently, file system 16 generates checkpoints CP1 in checkpoint area 63 (S170). Here, checkpoint area 63 comprises two areas 105a and 105b for storing checkpoints CP1. Accordingly, checkpoints CP1 generated whenever the checkpointing is performed may be alternately stored in the two areas 105a and 105b, as will be described with reference to FIGS. 13A and 13B. In the drawings, checkpoint CP1 is stored in area 105b. Checkpoint CP1 comprises checkpoint blocks CPB1 and CPB2, a journal block J1, and data segment summary blocks SS1, SS2, and SS3, but is not limited thereto.

Figure 13A:
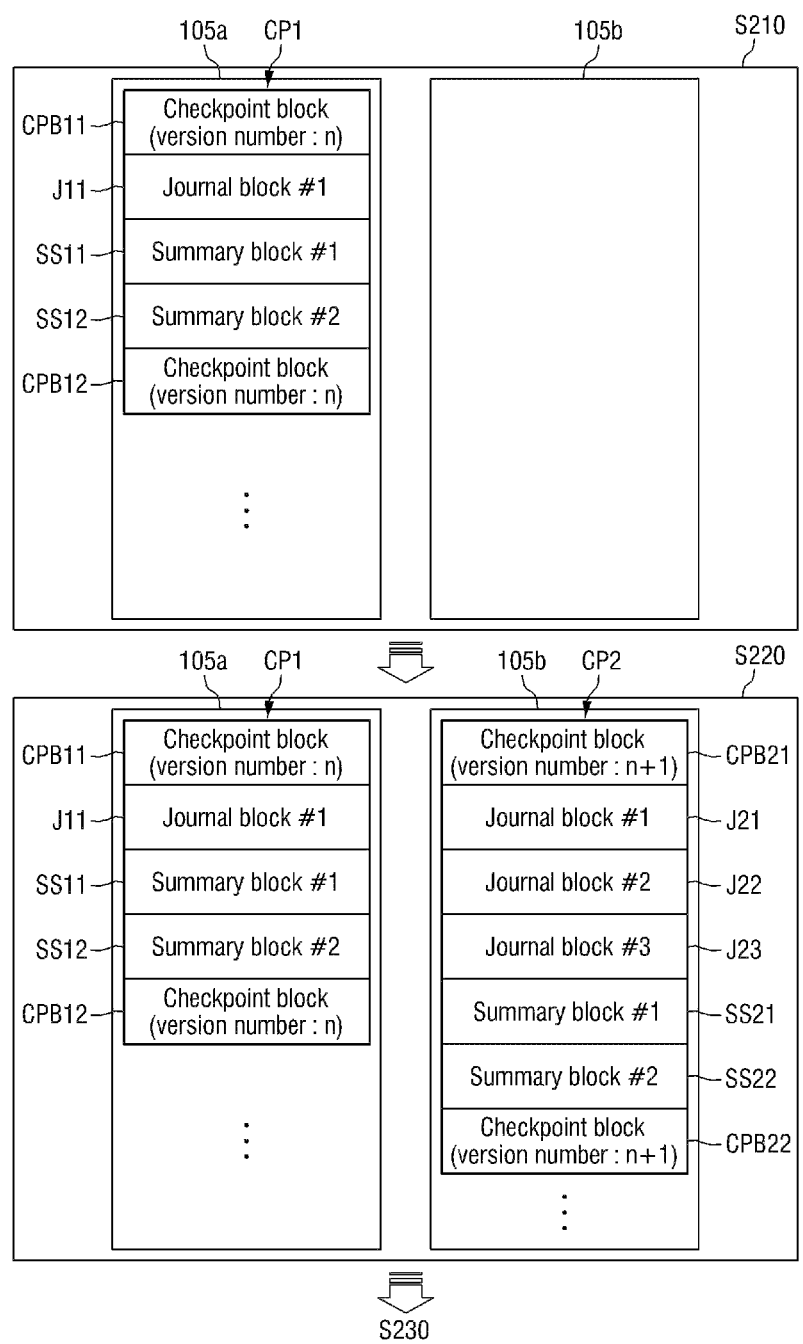
FIG. 13A is a block diagram illustrating a method performing checkpointing with two checkpoints according to an embodiment of the inventive concept.
Figure 13B:
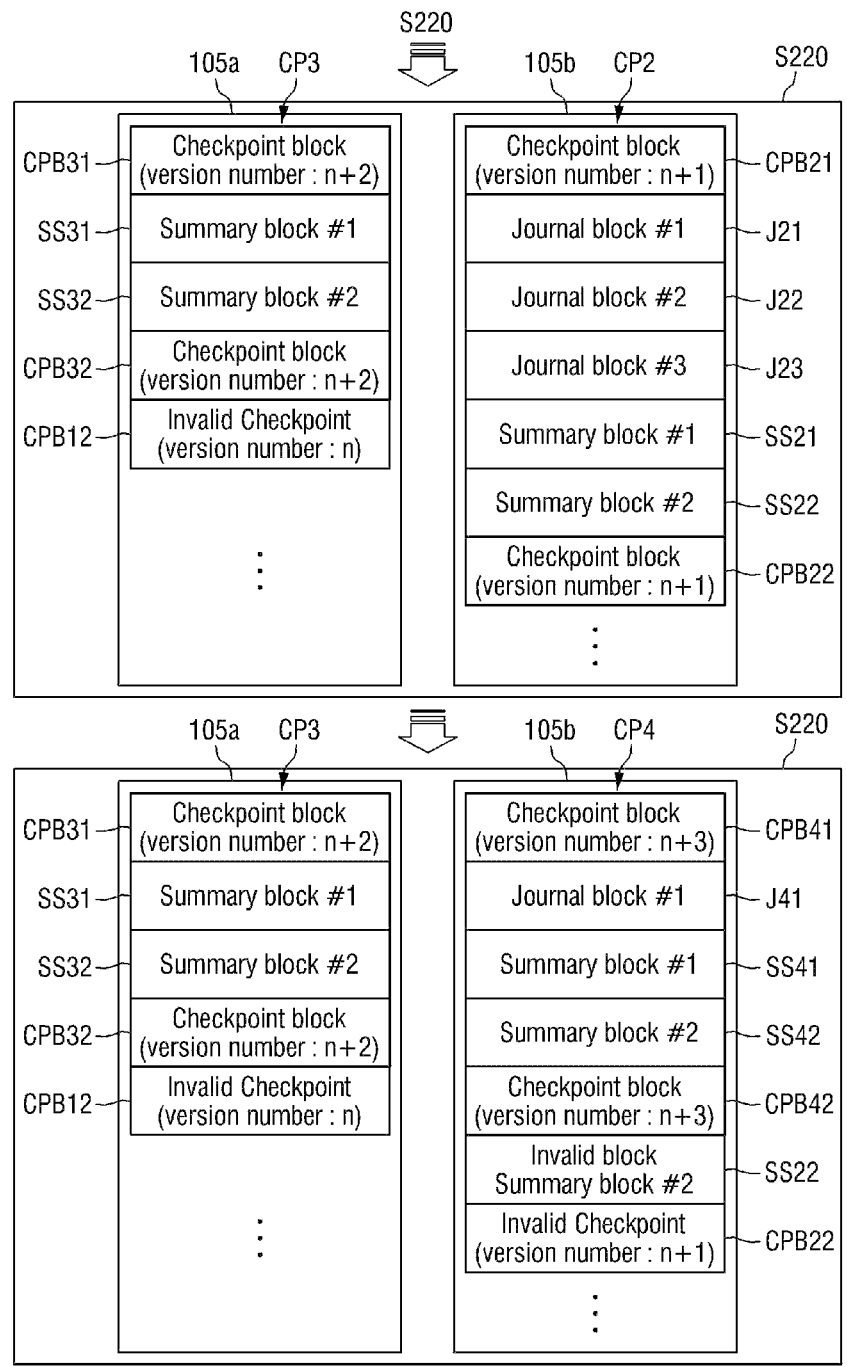
FIG. 13B is a block diagram illustrating another method performing checkpointing with two checkpoints according to an embodiment of the inventive concept.

FIGS. 13A and 13B are diagrams illustrating a method using two checkpoints in a computing system according to an embodiment of the inventive concept.

Referring to FIGS. 13A and 13B, checkpoint area 63 of storage device 20 comprises two areas 105a and 105b in which checkpoints CP1 to CP4 can be stored. The generated checkpoints CP1 to CP4 may be alternately stored in the two areas 105a and 105b.

Specifically, the checkpoint CP1 that is generated at first checkpointing is stored in area 105a (S210). Area 105b may be in a vacant state. Checkpoint CP1 may include, for example, checkpoint blocks CPB11 and CPB12, a journal block J11, and data segment summary blocks SS11 and SS12. As described above, the checkpoint blocks CPB11 and CPB12 may include a checkpoint version number. Here, the checkpoint version number may be n. Next, checkpoint CP2 that is generated at the second checkpointing is stored in area 105b (S220). Area 105a may be in a state where the checkpoint CP1 is still stored.

Checkpoint CP2 may comprise, for example, checkpoint blocks CPB21 and CPB22, journal blocks J21, J22, and J23, and data segment summary blocks SS21 and SS22. The checkpoint version number of the checkpoint blocks CPB21 and CPB22 may be n+1.

File system 16 compares the version number n of the checkpoint CP1 stored in area 105*a* with the version number n+1 of the checkpoint CP2 stored in area 105*b*, and it performs a recovery operation using the checkpoint CP2 having the latest version number n+1. However, for example, if a sudden power-off occurs during storing of the checkpoint CP2, file system 16 may perform the recovery operation using the previously stored checkpoint CP1. Then, checkpoint CP3 that is generated at the third checkpointing is stored in area 105*a* (S230). Area 105*b* may be in a state where checkpoint CP2 is still stored. Checkpoint CP3 may comprise, for example, checkpoint blocks CPB31 and CPB32 and data segment summary blocks SS31 and SS32.

The checkpoint area (see 63 in FIG. 5) may be located in first area I, and first area I may be an area that is used in a random write method. As described above, the checkpoint CP3 is overwritten in the area where the checkpoint CP1 is stored. Accordingly, as illustrated, the checkpoint block CPB12 of the checkpoint CP1 may remain in its location.

File system 16 compares a version number n+2 of the checkpoint CP3 stored in area 105*a* with a version number n+1 of the checkpoint CP2 stored in area 105*b*, and it performs the recovery operation using the checkpoint CP3 having the latest version number n+2. However, for example, if a sudden power-off occurs during storing of the checkpoint CP3, file system 16 may perform the recovery operation using the previously stored checkpoint CP2.

Next, checkpoint CP4 that is generated at the fourth checkpointing is stored in area 105*b* (S240). Area 105*a* may be in a state where the checkpoint CP3 is still stored. Checkpoint CP4 may include, for example, checkpoint blocks CPB41 and CPB42, data segment summary blocks SS41 and SS42, and a journal block J41.

The checkpoint area (see 63 in FIG. 5) may be located in first area I, and first area I may be an area that is used in a random write method. The checkpoint CP4 is overwritten in the area where the checkpoint CP2 is stored. Accordingly, as illustrated, the data segment summary block SS22 and the checkpoint block CPB22 of the checkpoint CP2 may remain in its location.

File system 16 compares the version number n+2 of the checkpoint CP3 stored in area 105*a* with the version number n+3 of the checkpoint CP4 stored in area 105*b*, and it performs the recovery operation using the checkpoint CP4 having the latest version number n+3. However, for example, if a sudden power-off occurs during storing of the checkpoint CP4, file system 16 may perform the recovery operation using the previously stored checkpoint CP3.

Figure 14:
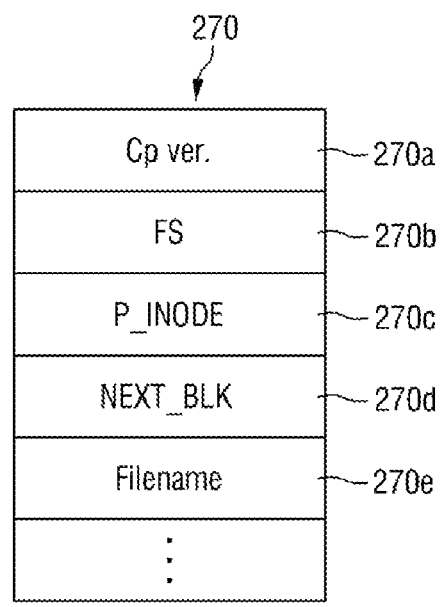
FIG. 14 is a diagram of a node in a file system of a computing system according to an embodiment of the inventive concept.

FIG. 14 is a diagram of a node used in a computing system according to an embodiment of the inventive concept.

Referring to FIG. 14, a node 270 used in computing system 1 comprises a checkpoint version number 270*a*, a file synchronization (fsync) mark 270*b*, a parent inode number 270*c*, position information 270*d* of a node block to be used next time, and a filename 270*e*.

Checkpoint version number 270*a* indicates a checkpoint to which node 270 corresponds. For example, if checkpoint CP that has been performed most lately is the n-th checkpoint (that is, if the version number of the checkpoint CP is n) before the node 270 is generated, the checkpoint version number 270*a* of the node 270 may be n+1.

Fsync mark 270*b* indicates whether the data related to the node 270 has been written according to an fsync command. Hereinafter, node 270 comprising fsync mark 270*b* is called an "fsync node", and the inode related to the fsync node is called an "fsync inode".

In a computing system according to an embodiment of the inventive concept, even if the write operation is performed according to the fsync command, the checkpointing is not performed. If the checkpointing is performed whenever the operation is performed according to the fsync command, the performance of the computing system in which the fsync command is frequently generated may deteriorate. Accordingly, in the computing system according to an embodiment of the inventive concept, the checkpointing is not performed with respect to the fsync command, but only the minimum information for performing roll forward remains in storage device 20. The roll forward operation will be described later using FIGS. 15 to 17.

During the recovery operation, parent inode number 270*c* and filename 270*e* are used when the directory of the node, of which the recovery is necessary, is recovered. Where a small number of files are generated and the fsync is performed in logging a directory operation log, a small amount of information is written in the block for the directory log, and this is inefficient. Accordingly, in computing system 1, parent inode number 270*c* and filename 270*e* are used in node 270, and thus unnecessary blocks for the directory log are not generated.

Additionally, position information 270*d* of a next node block provides advance notice to a currently used node block which node block is to be used next. The position information 270*d* is allocated in advance from the node address table 65, and thus it can be known in advance. Position information 270*d* reduces the amount of node blocks to be checked during the roll forward operation to be described later. This is because the whole node blocks are not checked, but only the node blocks connected through the position information 270*d* are checked.

Figure 15:
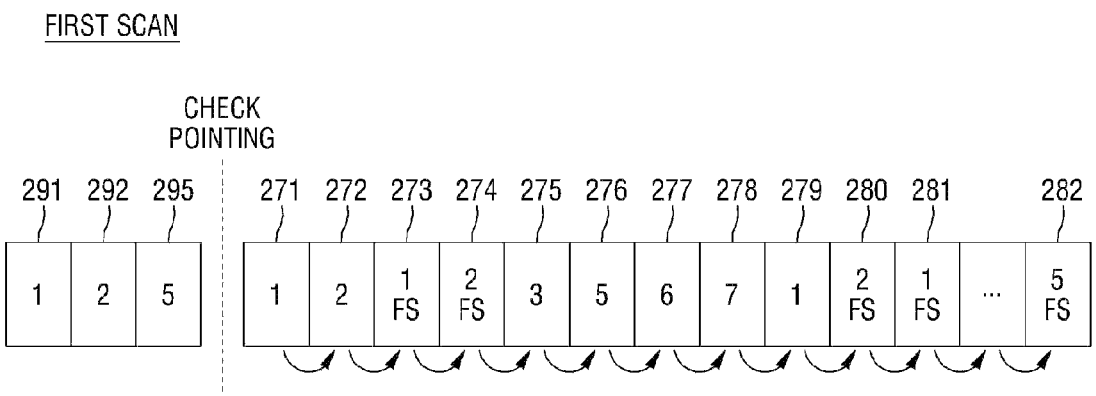
FIG. 15 is a diagram illustrating a recovery operation of a computing system according to an embodiment of the inventive concept.
Figure 16:
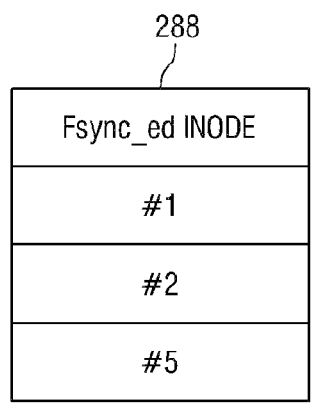
FIG. 16 is a diagram illustrating a recovery operation of a computing system according to an embodiment of the inventive concept.
Figure 17:
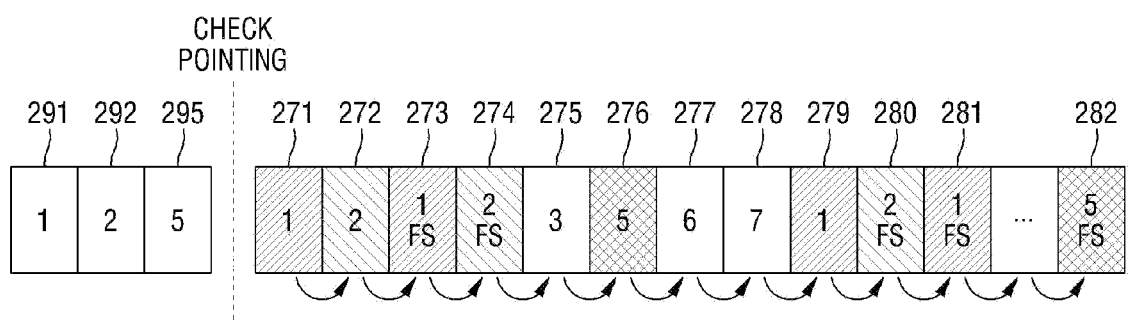
FIG. 17 is a diagram illustrating a recovery operation of a computing system according to an embodiment of the inventive concept.

FIGS. 15 to 17 are diagrams illustrating examples of a recovery operation used by computing system 1 according to an embodiment of the inventive concept. The description of FIGS. 15 to 17 focuses on a roll forward operation within the recovery operation described above.

Referring to FIG. 15, following a checkpointing operation, it is assumed that a plurality of nodes have been written in a plurality of node blocks 271 to 282 in a sequential write operation. Labels shown on node blocks 271 to 282 are identifiers (IDs) of inodes related to the respective nodes. That is, nodes stored in the node blocks 271, 273, 279, and 281 are included in the first inode, nodes stored in the node blocks 272, 274, and 280 are included in the second inode, and the node stored in the node block 275 is included in the third inode. Further, nodes stored in the node blocks 276 and 282 are included in the fifth inode, the node stored in the node block 277 is included in the sixth inode, and the node stored in the node block 278 is included in the seventh inode.

The label FS inscribed on the node blocks 271 to 282 indicate the above-described fsync marks. Arrows 299 shown below the node blocks 271 to 282 indicate that node blocks 271 to 282 are connected by chain through the position information (270*d* in FIG. 14) of the next node block. For example, position information 270*d*, which is stored in the node block 271, indicates the node block 272. That is, position information 270*d* indicates that node block 272 is to be used next to node block 271. Position information 270*d*, which is stored in the node block 271, indicates node block 273. That is, position information 270d indicates that the node block 273 is to be used next to node block 272.

In another example, a case where the recovery is performed due to a sudden power-off after the checkpointing will be described. First, the recovery is performed up to the state that is stored in the checkpoint CP using the checkpoint CP. Thereafter, through the roll forward operation, partial nodes that are not stored in the checkpoint CP are recovered.

First, node blocks 272 to 282 formed after the checkpointing are scanned using position information 270d of the next node block. Because each node has the position information 270d, only node blocks 271 to 282 formed after the checkpointing can be scanned rather than all of the node blocks. Through the first scanning, nodes for which the recovery is necessary can be selected. Specifically, after completing the first scanning, an fsync inode list 288 as shown in FIG. 16 is generated.

In the example illustrated in FIG. 15, fsync inode list 298 comprises a first inode, a second inode, and a fifth inode. That is, in node blocks 273, 274, 280, 281, and 282, nodes having fsync marks FS are stored. The nodes stored in the node blocks 273 and 281 are included in the first inode, the nodes stored in the node blocks 274 and 280 are included in the second inode, and the node stored in the node block 282 is included in the fifth inode.

The node for which the recovery is necessary may be at least one node that is included in the fsync inode in the list. Here, the nodes for which the recovery is necessary may be the nodes included in the first, second, and fifth inodes. That is, the nodes for which recovery is necessary may be node blocks 271, 273, 279, and 281 included in the first inode, node blocks 272, 274, and 280 in the second inode, and node blocks 276 and 282 in the fifth inode. Here, the nodes stored in the node blocks 271, 272, 276, and 279 can be recovered even if they do not include the fsync marks FS.

Referring to FIG. 17, node blocks 272 to 282 formed after the checkpointing are scanned using position information 270d. It is assumed that the last used node is the checkpointing node when the checkpointing is performed. For example, it is assumed that the checkpointing nodes stored in the node blocks 291, 292, and 295 are related to the first inode, the second inode, and the fifth inode.

While the second scanning is performed, the checkpointing node and the node for which the recovery is necessary are compared with each other to find a different point between the nodes, and the different point is reflected in the checkpointing node.

While node blocks 271 to 282 are scanned in order, the nodes for which the recovery is necessary are recovered, and other nodes are skipped. The node blocks 275, 277, and 278 are skipped. In the description that follows, only the recovering process related to the first inode will be described in detail. File system 16 reads the checkpointing node from node block 291, reads the node stored in node block 271, compares the read nodes with each other, and finds a first different point between the nodes. File system 16 reflects the first different point in the checkpointing node. The reason why the first different point is reflected in the checkpointing node is that the checkpointing node has passed through the checkpointing process and thus is determined to be a node having no error or problem.

Then, file system 16 finds a second different point through comparison of the checkpointing node in which the first different point has been reflected with the node stored in node block 273. File system 16 reflects the second different point in the checkpointing node in which the first different point has been reflected.

Then, file system 16 finds a third different point through comparison of the checkpointing node in which the second different point has been reflected with the node stored in the node block 279. File system 16 reflects the third different point in the checkpointing node in which the second different point has been reflected.

Then, file system 16 finds a fourth different point through comparison of the checkpointing node in which the third different point has been reflected with the node stored in node block 281. File system 16 reflects the fourth different point in the checkpointing node in which the third different point has been reflected. As a result, the checkpointing node in which all the different points have been finally reflected is generated.

File system 16 overwrites the checkpointing node in which all the different points have been reflected in node block 281. During the overwriting, the segment information table (e.g., element 64 in FIG. 5), the node address table (e.g., element 65 in FIG. 5), and the segment summary area (e.g., element 66 in FIG. 5), which are in first area I of storage device 20, are updated. As a result, the recovery related to the node 270 and the recovery related to the segment information table 64, the node address table 65, and the segment summary area 66 are all completed. Further, in the second scanning process, using the parent inode number and the filename, the directory of the node, of which the recovery is necessary, can be recovered.

Figure 18:
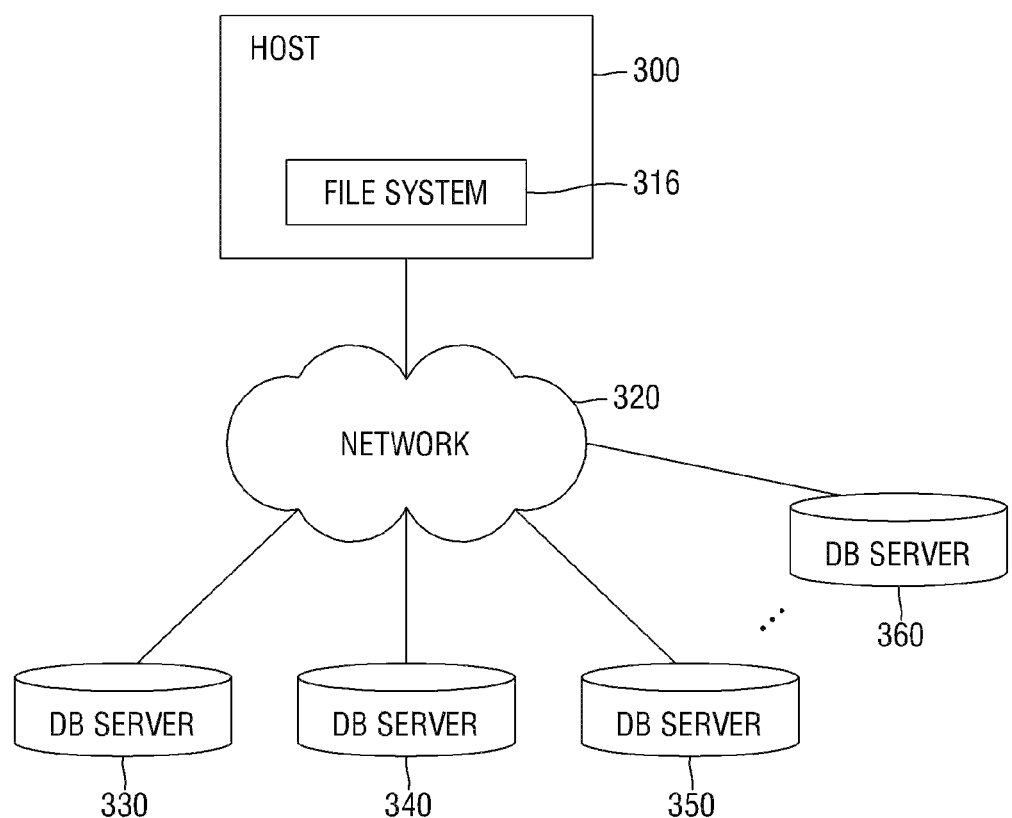
FIG. 18 is diagram of a computing system according to an embodiment of the inventive concept.

FIG. 18 is block diagram illustrating an example of a computing system according to an embodiment of the inventive concept.

Referring to FIG. 18, a host server 300 is connected to a plurality of database servers 330, 340, 350, and 360 through a network 20. In host server 300, a file system 316 is installed for managing data of database servers 330, 340, 350, and 360. File system 316 can be any one of the file systems as described above with reference to FIGS. 1 to 17.

Figure 19:
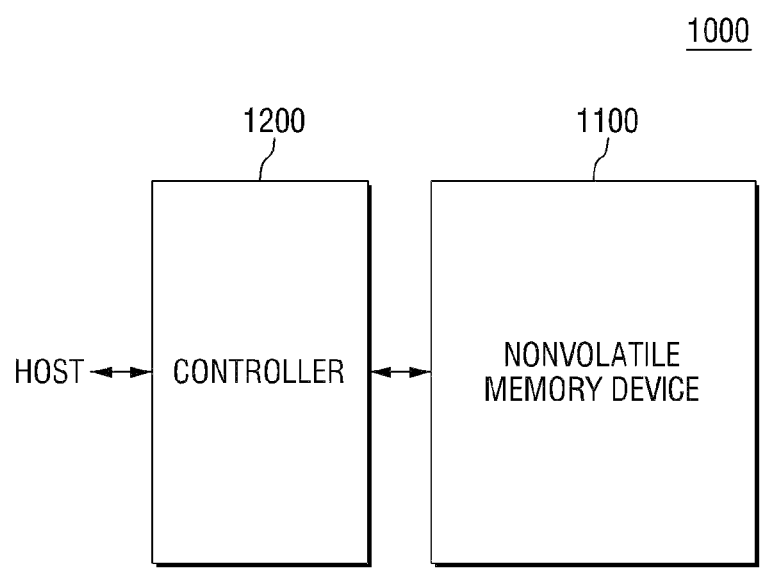
FIG. 19 is a diagram of a computing system according to an embodiment of the inventive concept.
Figure 20:
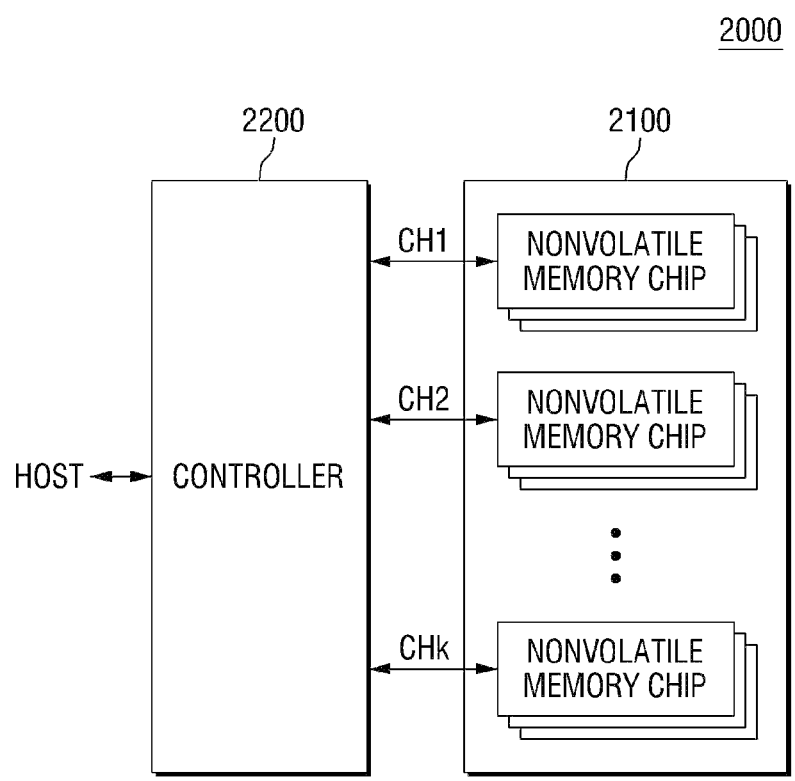
FIG. 20 is a diagram of a computing system according to an embodiment of the inventive concept.
Figure 21:
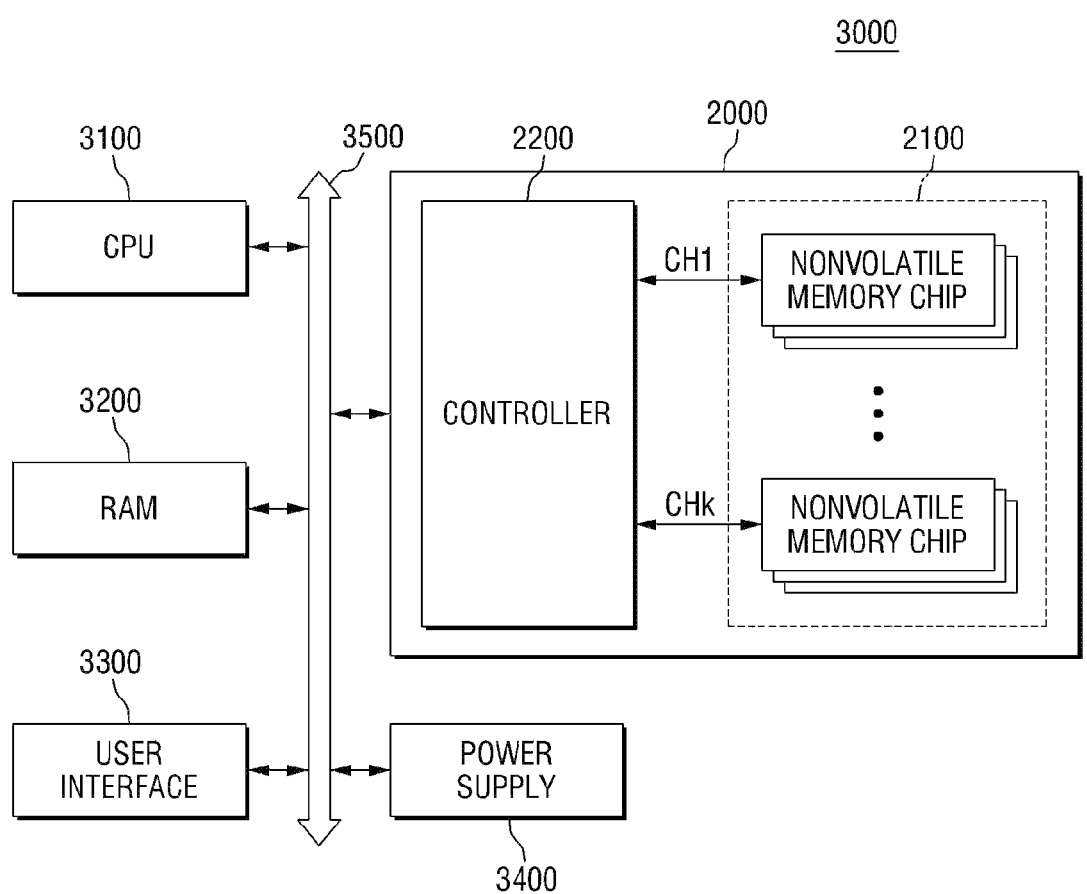
FIG. 21 is a block diagram illustrating another example of a computing system according to some embodiments of the inventive concept.

FIGS. 19 to 21 are block diagrams illustrating other examples of computing systems according to embodiments of the inventive concept.

Referring to FIG. 19, a storage device 100 (e.g., storage device 20 in FIG. 1) comprises a nonvolatile memory device 1100 and a controller 1200. Nonvolatile memory device 1100 may store the above-described superblocks 61 and 62, the checkpoint area 63, the segment information table 64, and the node address table 65.

Controller 1200 is connected to a host and nonvolatile memory device 1100. Controller 1200 is configured to access the nonvolatile memory device 1100 in response to a request from the host. For example, the controller 1200 may be configured to control read, write, erase, and background operations of the nonvolatile memory device 1100. The controller 1200 may be configured to provide an interface between the nonvolatile memory device 1100 and the host. Further, the controller 1200 may be configured to drive firmware to control the nonvolatile memory device 1100.

Controller 1200 may further comprise well known constituent elements, such as a Random Access Memory (RAM), a central processing unit, a host interface, and a memory interface. The RAM can be used as at least one of an operating memory of the central processing unit, a cache memory between the nonvolatile memory device 1100 and the host, and a buffer memory between the nonvolatile memory device 1100 and the host. The processing unit can control overall operations of the controller 1200.

Controller 1200 and nonvolatile memory device 1100 may be integrated into one semiconductor device. For instance, controller 1200 and the nonvolatile memory device 1100 may be integrated into one semiconductor device for a memory card. For example, controller 1200 and nonvolatile memory device 1100 may be integrated into one semiconductor device to configure a memory card, such as a PC card (PCMCIA (Personal Computer Memory Card International Association)), a compact flash (CF) card, a smart media card (SM or SMC), a memory stick, a multimedia card (MMC, RS-MMC, MMCmicro), a SD card (SD, miniSD, microSD, or SDHC), a universal flash storage device (UFS), or the like.

Controller 1200 and nonvolatile memory device 1100 may be integrated into one semiconductor device to form an SSD. Where system 1000 is used as an SSD, the operating speed of the host that is connected to the 1000 can be remarkably improved.

As another example, the system 1000 may be provided as one of various constituent elements of electronic devices, such as a computer, a Ultra Mobile PC (UMPC), a work station, a net-book, a Personal Digital Assistant (PDA), a portable computer, a web tablet, a wireless phone, a mobile phone, a smart phone, an e-book, a Portable Multimedia Player (PMP), a portable game machine, a navigation device, a black box, a digital camera, a 3-dimensional television receiver, a digital audio recorder, a digital audio player, a digital picture recorder, a digital picture player, a digital video recorder, a digital video player, a device that can transmit and receive information in a wireless environment, one of various electronic devices constituting a home network, one of various electronic devices constituting a computer network, one of various electronic devices constituting a telematics network, an RFID device, or one of various constituent elements constituting a computing system.

Nonvolatile memory device 1100 or system 1000 may be mounted in various types of packages. For example, nonvolatile memory device 1100 or system 1000 may be packaged and mounted as Package on Package (PoP), a ball grid array (BGAs), chip scale package (CSP), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like.

Referring to FIG. 20, a system 2000 comprises a nonvolatile memory device 2100 and a controller 2200. Nonvolatile memory device 2100 comprises a plurality of nonvolatile memory chips. The plurality of memory chips are divided into a plurality of groups. The respective groups of the plurality of nonvolatile memory chips are configured to communicate with the controller 2200 through one common channel. For example, it is illustrated that the plurality of nonvolatile memory chips communicate with the controller 2200 through first to k-th channels CH1 to CHk. In FIG. 20, the plurality of nonvolatile memory chips are connected to one channel, but system 2000 can be modified so that one nonvolatile memory chip is connected to one channel.

Referring to FIG. 21, a system 3000 comprises a central processing unit 3100, a RAM 3200, a user interface 3300, a power supply 3400, and system 2000 of FIG. 20.

System 2000 is electrically connected to central processing unit 3100, RAM 3200, user interface 3300, and power supply 3400 through a system bus 3500. Data provided through user interface 3300 or is processed by the central processing unit 3100 is stored in system 2000.

FIG. 21 illustrates that nonvolatile memory device 2100 is connected to system bus 3500 through controller 2200. However, nonvolatile memory device 2100 may be configured to be directly connected to system bus 3500.

The foregoing is illustrative of embodiments and is not to be construed as limiting thereof. Although a few embodiments have been described, those skilled in the art will readily appreciate that many modifications are possible in the embodiments without departing from scope of the inventive concept as defined in the claims.

What is claimed is:

1. A method of performing data management in a computing system including a storage device having a first area and a second area, comprising:
    performing a checkpointing operation comprising storing a checkpoint of the computing system in the first area of the storage device by a random write method;
    writing a plurality of nodes in a plurality of node blocks in the second area of the storage device by a sequential write method after the checkpointing operation, each of the plurality of nodes comprising position information of a next node block; and
    during a subsequent recovery operation, selecting a node for recovery by scanning of the plurality of node blocks using the position information,
    wherein performing the checkpointing operation comprises generating the checkpoint comprising a checkpoint block, a data segment summary block, and a journal block, and
    wherein checkpoints are alternately stored in two different checkpoint areas in the first area of the storage device in successive checkpointing operations.

2. The method of claim 1, wherein at least one of the plurality of nodes further comprises a file synchronization (fsync) mark that indicates whether related data has been written according to an fsync command.

3. The method of claim 2, wherein the at least one of the plurality of nodes comprising the fsync mark is an fsync node, an index node (inode) related to the fsync node is an fsync inode, and the selected node is at least one node included in the fsync inode.

4. The method of claim 1, wherein the plurality of nodes include a parent inode number and a filename.

5. The method of claim 4, further comprising recovering a directory of the selected node using the parent inode number and the filename.

6. The method of claim 1, further comprising, where a most recently used node is a checkpointing node, comparing the checkpointing node with the selected node to find a difference point between the compared nodes when performing the checkpointing operation, and storing an indication of the difference point in the checkpointing node.

7. The method of claim 1, wherein changes of a node address table and a segment information table are stored in the data segment summary block.

8. A computing system, comprising:
    a storage device comprising a first area and a second area; and
    a host device controlling the storage device,
    wherein the host device stores checkpoints in the first area by a random write method, stores a plurality of data in a plurality of data blocks of the second area, and stores a plurality of nodes corresponding to the plurality of data in a plurality of node blocks of the second area by a sequential write method, and wherein each of the nodes comprises position information of a next node block, and a node for which recovery is to be performed is selected by scanning the plurality of node blocks using the position information during a recovery operation, wherein a checkpointing operation is performed by generating a checkpoint comprising a checkpoint block, a data segment summary block, and a journal block, and wherein checkpoints are alternately stored in two different checkpoint areas in the first area of the storage device in successive checkpointing operations.

9. The computing system of claim 8, wherein at least one of the plurality of nodes further comprises a file synchronization (fsync) mark that indicates whether related data has been written according to an fsync command.

10. The computing system of claim 9, wherein the node including the fsync mark is an fsync node and an index node (inode) related to the fsync node is an fsync inode, and the selected node is a node that is included in the fsync inode.

11. The computing system of claim 8, wherein the plurality of nodes comprises a parent inode number and a filename.

12. The computing system of claim 11, wherein the host device recovers a directory of the selected node using the parent inode number and the filename.

13. The computing system of claim 8, wherein, where a most recently used node is a checkpointing node, the system compares the checkpointing node with the selected node to find a difference point between the compared nodes when performing the checkpointing operation, and stores an indication of the difference point in the checkpointing node.

14. The computing system of claim 8, wherein changes of a node address table and a segment information table are stored in the data segment summary block.

15. A computing system, comprising:

a file system managing a storage device having a first area and a second area, wherein the file system performs a checkpointing operation to write checkpoints in the first area of the storage device using a random write method, writes a plurality of data in a plurality of data blocks in the second area of the storage device by a sequential write method, and wherein each of the nodes comprises position information of a next node block, and a node for which recovery is to be performed is selected by scanning the plurality of node blocks using the position information during a recovery operation, wherein the checkpointing operation is performed by generating a checkpoint comprising a checkpoint block, a data segment summary block, and a journal block, and wherein checkpoints are alternately stored in two different checkpoint areas in the first area of the storage device in successive checkpointing operations.

* * * * *